(12) United States Patent
Claussen et al.

(10) Patent No.: US 7,455,369 B2
(45) Date of Patent: Nov. 25, 2008

(54) SPRING-ACTUATED PARKING BRAKE FOR A VEHICLE HAVING A POWER-OPERATED BRAKING SYSTEM

(75) Inventors: Heiko Claussen, Hannover (DE); Jürgen Eickhoff, Walsrode (DE); Helmut Kortschakowski, Garbsen (DE); Klaus Pape, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 10/844,041

(22) Filed: May 12, 2004

(65) Prior Publication Data

US 2005/0023892 A1     Feb. 3, 2005

(30) Foreign Application Priority Data

May 30, 2003     (DE)     ............... 103 24 723

(51) Int. Cl.
*B60T 13/74* (2006.01)
*B60T 7/00* (2006.01)
(52) U.S. Cl. ............... 303/3; 303/157; 303/158; 188/352
(58) Field of Classification Search ............... 303/3, 303/10, 15, 122, 127, 157, 158, 191, 199, 303/20, 63; 188/151 R, 152, 352
See application file for complete search history.

(56) References Cited

U.S. PATENT DOCUMENTS 4,763,959 A * 8/1988 Vandemotter ............... 303/9
5,203,616 A * 4/1993 Johnson ..................... 303/10
5,480,769 A * 1/1996 Ueffinger et al. ........... 430/401
5,984,430 A * 11/1999 Koga et al. ................. 303/116.1
6,053,583 A * 4/2000 Izumi et al. ................. 303/150
6,698,555 B2 * 3/2004 Schafer et al. .............. 188/170
2002/0147072 A1* 10/2002 Goodell et al. .............. 477/183
2003/0090148 A1* 5/2003 Eliasson ..................... 303/122.09

FOREIGN PATENT DOCUMENTS

| DE | 35 44 356 A1 | 6/1987 |
| DE | 4139078 A1 * | 6/1993 |
| DE | 195 37 622 A1 | 4/1997 |
| DE | 197 52 022 A1 | 5/1999 |

* cited by examiner

*Primary Examiner*—Melody M Burch
(74) *Attorney, Agent, or Firm*—Kramer Levin Naftalis & Frankel LLP

(57) ABSTRACT

A spring-actuated parking brake includes a spring brake actuator communicating with a fluid source via a supply line. In brake released condition, the actuator is pressurized via a supply valve; in engaged condition, the actuator communicates with a pressure sink via the supply valve and a pressure-relief line. During brake engagement, the supply valve and a shutoff valve between the supply valve and actuator are switched to flow-enabled position for pressure relief of the actuator placing it in communication with the pressure sink. For brake release, the supply valve is switched to the fluid source and the shutoff valve is switched to fluid-passing position communicating with the fluid source to pressurize the brake cylinder. After brake engagement, the shutoff valve is switched to shut-off position decoupling the actuator from the supply line; the supply valve is switched to flow-enabled position placing the supply line in communication with the pressure sink.

18 Claims, 1 Drawing Sheet

SPRING-ACTUATED PARKING BRAKE FOR A VEHICLE HAVING A POWER-OPERATED BRAKING SYSTEM

BACKGROUND OF THE INVENTION

The present invention relates to an improved spring-actuated parking brake for vehicles equipped with power-operated (non-muscular energy) braking systems.

Parking braking systems for vehicles are available in diverse types, including cable parking brakes, air-released spring-actuated parking brakes and hydraulically releasable spring-actuated parking brakes. A complex cable mechanism is a primary disadvantage of cable parking brakes, as it takes up considerable space and is highly susceptible to malfunction. Also, automatic brake actuation is not possible with cable parking brakes. Disadvantages of conventional air-released spring-actuated parking brakes lie mainly in the complex compressed air supply and in the requirement to locate the operating valve for the spring-actuated brake in the vehicle cab. Disadvantages of conventional hydraulically releasable spring-actuated brakes lie mainly in the complex valves and hydraulic pressure supply and the location of pressure lines in the vehicle cab.

It is desired to provide an improved spring-actuated vehicle parking brake that overcomes the disadvantages associated with conventional constructions and that avoids undesired changes in the condition of the parking brake due to improper driver operation or occurrence of failures, while satisfying legal requirements applicable to such vehicle parking brakes.

SUMMARY OF THE INVENTION

Generally speaking, in accordance with the present invention, a spring-actuated parking brake for vehicles equipped with power-operated (non-muscular engery) braking systems is provided which improves over prior art devices.

The spring-actuated parking brake according to a preferred embodiment of the present invention includes one or more spring brake actuators in fluid communication with a fluid source via a supply line, a fluid supply valve, and a shutoff valve disposed between the supply valve and the actuator. To engage the parking brake, the supply and shutoff valves are switchable to a fluid flow-enabled position in which the actuator is in fluid communication with the pressure sink effect pressure relief of the actuator. To release the parking brake, the supply valve is switchable to a fluid supply position effecting fluid communication with the fluid source, and the shutoff valve is switchable to a fluid passing position to place the actuator in fluid communication with the fluid source and to inject pressure into the spring brake cylinder. When the parking brake has been released, the shutoff valve is switchable to a shutoff position to decouple the actuator from the supply line, and the supply valve is switchable back to the fluid flow-enabled position to place the supply line in communication with the pressure sink.

Accordingly, it is an object of the present invention to provide a spring-actuated vehicle parking brake which provides improved functionality and increased braking system safety by avoiding undesired changes in the condition of the parking brake due to improper driver operation or occurrence of failures, all while satisfying legal requirements applicable to such vehicle parking brakes.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
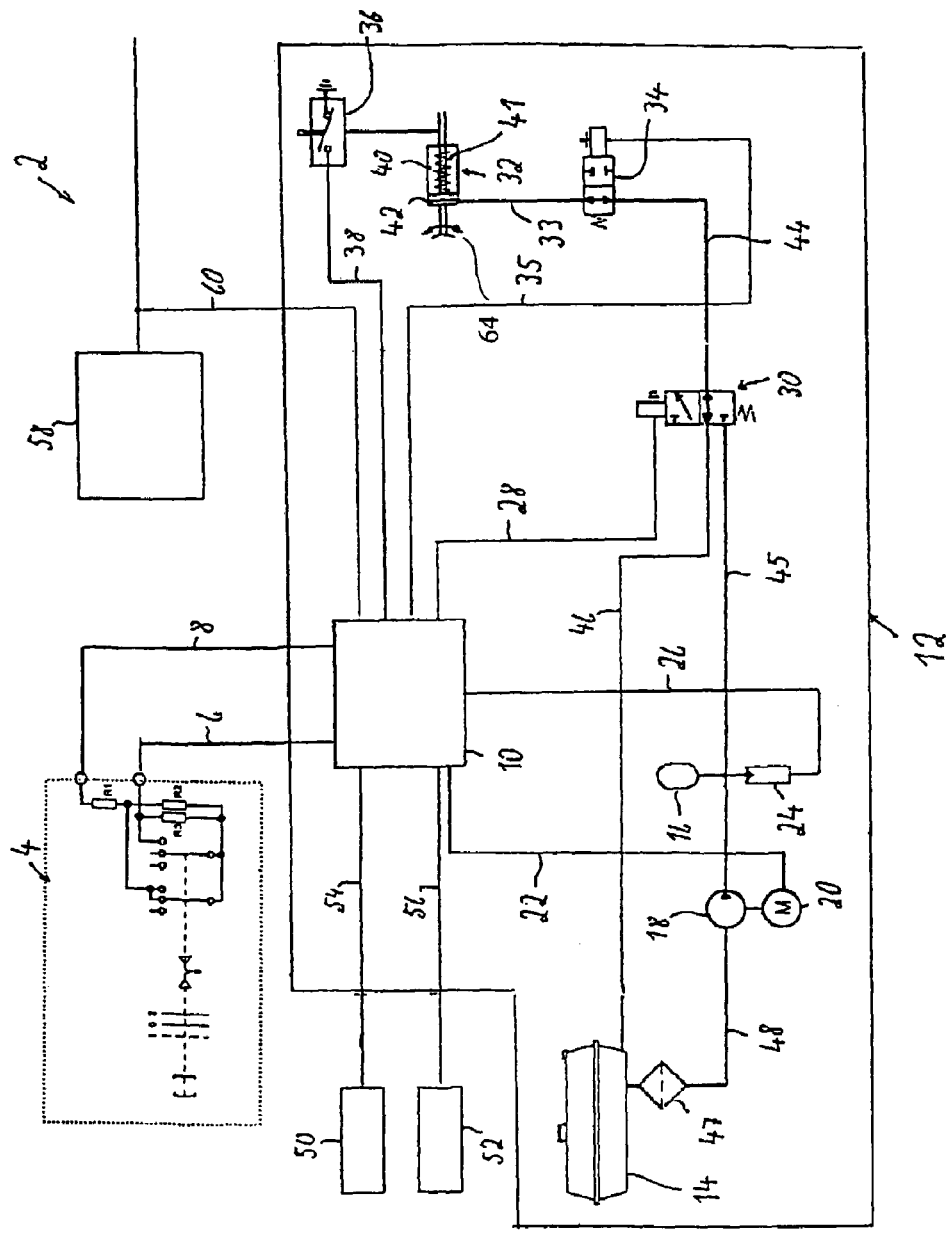
FIG. 1 is a schematic diagram depicting a portion of an electrohydraulic spring-actuated vehicle parking brake constructed and arranged in accordance with a preferred embodiment of the present invention.

Referring now to FIG. 1, a portion of the spring-actuated braking system 2 according to a preferred embodiment of the present invention includes a parking brake switch 4 used to actuate the parking brake (the parking brake comprising conventional parking brake elements represented by reference number 64). As shown, switch 4 is preferably a combination push-pull switch which is not provided with a locking device or latching positions and which is biased to return to a central, neutral position. For example, the parking brake is released when the switch is pushed and engaged when the switch is pulled. The actuation condition of the parking brake is indicated by a light, for example.

To ensure that the parking brake can be actuated by different devices, as mentioned above, switch 4 is designed without latching positions and therefore cannot lock in actuation conditions. In this way, there is no need for complex mechanical devices to reset the switch from a latched position or locked condition.

Parking brake switch 4 is electrically connected via lines 6, 8 to a central control unit 10, which controls the parking brake via a fluid circuit 12. Fluid circuit 12 includes a fluid reservoir 14, a fluid energy accumulator 16 as the pressure source, a fluid pump 18 driven by a motor 20 (which can be controlled via an electric line 22 by control unit 10), a pressure sensor 24 (which is shown in FIG. 1 as a variable resistor and which monitors the pressure in energy accumulator 16 and is connected via an electric line 26 to control unit 10), a supply valve 30 (which can be actuated electromagnetically by the control unit via a line 28), a spring brake actuator 32, a further shutoff valve 34 (which can be electromagnetically switched by control unit 10 via a line 35 and is disposed between supply valve 30 and spring brake actuator 32 in connecting lines 44 and 33 between supply valve 30 and spring brake actuator 32), and a pressure or displacement sensor 36 (which monitors the functioning of spring brake actuator 32 and is connected via an electric line 38 to central control unit 10 in order to detect and compensate for failures of the parking brake).

Spring brake actuator 32 is provided with a spring chamber 40 containing spring 41 and with a pressure chamber 42, which can be placed in communication with energy accumulator 16 and pump 18 via valves 34 and 30 and supply lines 33 and 44 and a pressure line 45, and with reservoir 14 via a pressure-relief line 46.

Reference numeral 47 denotes a filter disposed in a connecting line 48 between pump 16 and reservoir 14.

Reference numerals 50 and 52 denote devices that transmit information on the ignition condition and battery condition to central control unit 10 via electric lines 54 and 56, to determine whether battery voltage is available for the system so that, for example, the valves can be actuated. The ignition information is important, for example, where the parking brake is required to be automatically engaged if the ignition is turned off, this situation representing another possibility for activating the parking brake.

Reference numeral 58 denotes gearbox control electronics, via which, in the case of an automatic gearbox, for example, central control unit 10 receives a signal via an electric line 60 that the parking brake is to be engaged when the automatic gearbox is shifted into park position. Control electronics 58 receives information to this effect via a data bus 62.

Pressure in fluid energy accumulator 16 is monitored by pressure sensor 24. If the pressure in energy accumulator 16 drops below a presettable value, this condition is signaled to central control unit 10 by the pressure sensor. Control unit 10 then turns on motor 20 to actuate pump 18, which then recharges the energy accumulator by pumping fluid from fluid reservoir 14 into energy accumulator 16.

Supply valve 30, as shown in FIG. 1, can be designed as a 3/2-way valve, which is normally in open position to enable flow in two directions and which can be electromagnetically switched against a restoring spring. It should be appreciated, however, that supply valve 30 may also be designed as, for example, using 2/2-way valves or other valve design.

Also, the further shutoff valve 34, as depicted in FIG. 1, can be designed as a 2/2-way valve, which in normal position is open to enable flow in two directions and which can be electromagnetically switched against a restoring spring into a shut-off position.

The drawing shows supply valve 30 and valve 34 in their normal positions, in which pressure chamber 42 of spring brake actuator 32 is in communication via these two valves with fluid reservoir 14, which functions as the pressure sink, the chamber thereby being depressurized and the parking brake being engaged.

To release the parking brake after actuation of switch 4, the pressure stored in energy accumulator 16 is used. For this purpose, supply valve 30 is changed over by electronic control unit 10. Via the supply valve, the pressure of the energy accumulator is passed into pressure chamber 42 of spring brake actuator 32, whereby spring 41 in the spring brake actuator is compressed and the parking brake is released. In this released condition of the parking brake, or in other words when pressure chamber 42 is pressurized, central control unit 10 changes 2/2-way shutoff valve 34 over to closed condition; thereafter supply line 44 is switched to pressureless condition by changeover of the supply valve to the illustrated normal position. This has the advantage, for example, that, in the simplest case, if a line breaks, the spring brake actuator is not automatically depressurized to activate the parking brake.

In order to prevent the danger of a break in line 33 between 2/2-way shutoff valve 34 and spring brake cylinder 32, 2/2-way valve 34 is disposed as closely as possible to and preferably directly on spring brake actuator 32. In the non-energized condition, or in other words in the flow-enabled normal position, the 2/2-way valve does not have any influence on the position of spring brake actuator 32.

As discussed above, pressure or displacement sensor 36 is used to monitor the functioning of spring brake actuator 32. Sensor 36 checks, after the parking brake has been turned on, whether a mechanical reaction is actually taking place at the brake. If the sensor detects a leak, this is signaled to electronic control device 10, which then changes over supply valve 30 from normal position and de-energizes 2/2-way valve 34, or in other words switches it to the normal, fluid passing position, whereby pressure chamber 42 of spring brake actuator 32 is refilled with fluid from energy accumulator 16. After pressure sufficient to release the parking brake has been reached, the 2/2-way valve is again changed over to shut-off condition and supply valve 30 is switched back to the normal, fluid passing condition, so that supply line 44 becomes pressureless once again. The action of switching the supply line to pressureless condition reduces the danger of a line break, since the pressure lines are usually routed transversely through the vehicle.

Central control unit 10 monitors and controls the electrical conditions of valves 30 and 34. If shutoff valve 34 is inadvertently changed over from closed position to open position, the central control unit recognizes this situation as a defect and changes over supply valve 30 from passing position to supply position, thus establishing communication between spring brake actuator 32 and fluid source 16, so that pressure chamber 42 of spring brake actuator 32 continues to be pressurized and the spring-actuated brake remains released, thus preventing inadvertent engagement of the parking brake in the event of a defect in shutoff valve 34.

Without shutoff valve 34, the parking brake is released or engaged depending on the switched position of supply valve 30. If the parking brake is released, supply line 44 is in communication with pressure accumulator 16 and spring 41 in spring brake actuator 32 is compressed. This represents the normal condition during driving. If a single failure such as a break in supply line 44 or a defect in valve 30 occurs in such a configuration without valve 34, it leads to a pressure drop in pressure chamber 42 of spring brake actuator 32, whereby spring 41 expands and the parking brake is inadvertently applied.

By incorporation of shutoff valve 34, it is possible to interlock the parking brake and to make supply line 44 pressureless by switching supply valve 30 back to normal, fluid passing condition. The pressure in pressure chamber 42 of spring brake actuator 32, and, thus, in the parking brake, is maintained, and so a failure in supply line 44, such as a line break, or a failure of valve 30 cannot influence the parking brake, which remains released. Furthermore, a break in line 44 no longer leads to loss of brake fluid and failure of the brake circuit.

The invention has been described on the basis of the drawing for a hydraulic spring-actuated parking braking system; it should be understood, however, that the invention can be used analogously in an air-braking system.

Accordingly, the present invention provides an improved spring-actuated vehicle parking brake for vehicles equipped with power-operated (non-muscular energy) braking systems that is constructed and arranged to avoid undesired changes in the condition of the parking brake during improper operation and to compensate for failures.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A spring-actuated parking brake system for a vehicle, comprising at least one spring brake actuator in fluid communication with a fluid source via a supply line, a pressurized fluid supply valve, a shutoff valve disposed between said supply valve and said at least one actuator, said supply valve and said shutoff valve each being switchable to a bidirectional fluid flow-enabled position in which said at least one actuator is in fluid communication with a pressure sink to effect pressure relief of said at least one actuator and to engage a parking brake, said supply valve being switchable to a fluid supply position effecting fluid communication with said fluid source and said shutoff valve being switchable to said bidirectional fluid flow-enabled position to place said at least one actuator in fluid communication with said fluid source and to inject pressure into said at least one actuator to release said parking brake, and, when said parking brake is released, said shutoff valve being automatically switchable to a shutoff position to decouple said at least one actuator from said supply line, and to prevent depressurization of said at least one actuator and actuation of said parking brake when said supply line is broken, and said supply valve being switchable to said bidirectional fluid flow-enabled position to place said supply line in communication with said pressure sink.

2. The spring-actuated parking brake system according to claim 1, wherein said supply valve is a 3/2-way valve, said 3/2-way valve being electromagnetically actuatable to said fluid supply position against a restoring force.

3. The spring-actuated parking brake system according to claim 1, wherein said supply valve is formed from two 2/2-way valves.

4. The spring-actuated parking brake system according to claim 1, wherein said shutoff valve is a 2/2-way valve, said 2/2-way valve being electromagnetically actuatable to said shutoff position against a restoring force.

5. The spring-actuated parking brake system according to claim 4, wherein said shutoff valve is disposed at least one of proximate to said at least one spring brake actuator and directly on said at least one spring brake actuator.

6. The spring-actuated parking brake system according to claim 1, further comprising a central control unit for controlling said supply and shutoff valves.

7. The spring-actuated parking brake system according to claim 6, further comprising at least one of a pressure sensor and displacement sensor electrically connected to said central control unit for monitoring said at least one spring brake actuator for proper functioning.

8. The spring-actuated parking brake system according to claim 6, wherein said central control unit is adapted to switch said supply valve from said bidirectional fluid flow-enabled position to said fluid supply position and to switch said shutoff valve to said fluid flow-enabled position to place said at least one spring brake actuator in communication with said supply line and said fluid source to effect refilling of said at least one spring brake actuator from said fluid source when a fluid leak is present in said at least one spring brake actuator.

9. The spring-actuated parking brake system according to claim 6, wherein said central control unit is adapted to switch said supply valve to said fluid supply position to place said at least one spring brake actuator in communication with said fluid source when a defective changeover of said shutoff valve to said bidirectional fluid flow-enabled position occurs.

10. In a spring-actuated parking brake system for a vehicle, said system including at least one spring brake actuator in fluid communication with a fluid source via a supply line, a pressurized fluid supply valve, a shutoff valve disposed between said supply valve and said at least one actuator, said supply valve and said shutoff valve each being switchable to a bidirectional fluid flow-enabled position in which said at least one actuator is in fluid communication with a pressure sink to effect pressure relief of said at least one actuator and to engage a parking brake, said supply valve being switchable to a fluid supply position effecting fluid communication with said fluid source and said shutoff valve being switchable to said bidirectional fluid flow-enabled position to place said at least one actuator in fluid communication with said fluid source and to inject pressure into said at least one actuator to release said parking brake, a method for preventing depressurization of said actuator when said parking brake is released, comprising the steps of automatically switching said shutoff valve to a shutoff position to decouple said at least one actuator from said supply line, and switching said supply valve to said bidirectional fluid flow-enabled position to place said supply line in communication with said pressure sink.

11. The method according to claim 10, wherein said supply valve is a 3/2-way valve, said 3/2-way valve being electromagnetically actuatable to said fluid supply position against a restoring force.

12. The method according to claim 10, wherein said supply valve is formed from two 2/2-way valves.

13. The method according to claim 10, wherein said shutoff valve is a 2/2-way valve, said 2/2-way valve being electromagnetically actuatable to said shutoff position against a restoring force.

14. The method according to claim 13, wherein said shutoff valve is disposed at least one of proximate to said at least one spring brake actuator and directly on said at least one spring brake actuator.

15. The method according to claim 10, wherein said steps of automatically switching said shutoff valve to a shutoff position and switching said supply valve to said bidirectional fluid flow-enabled position are effected using a central control unit.

16. The method according to claim 15, further comprising the step of monitoring said at least one spring brake actuator for proper functioning using at least one of a pressure sensor and displacement sensor electrically connected to said central control unit.

17. The method according to claim 15, further comprising the steps of switching said supply valve from said bidirectional fluid flow-enabled position to said supply position and switching said shutoff valve to said bidirectional fluid flow-enabled position using said central control unit to place said at least one spring brake actuator in communication with said supply line and said fluid source to effect refilling of said at least one spring brake actuator from said fluid source when a fluid leak is present in said at least one spring brake actuator.

18. The method according to claim 15, further comprising the steps of switching said supply valve to said fluid supply position to place said at least one spring brake actuator in communication with said fluid source using said central control unit when a defective changeover of said shutoff valve to said bidirectional fluid flow-enabled position occurs.

* * * * *